(12) United States Patent
Williams, Jr.

(10) Patent No.: US 7,293,791 B1
(45) Date of Patent: Nov. 13, 2007

(54) TELESCOPING AND SWIVELING HITCH ASSEMBLY

(76) Inventor: Thomas M. Williams, Jr., 2310 Old Oxford Rd., Durham, NC (US) 27704

( * ) Notice: Subject to any disclaimer, the term of this patent is extended or adjusted under 35 U.S.C. 154(b) by 42 days.

(21) Appl. No.: 10/908,514

(22) Filed: May 16, 2005

Related U.S. Application Data

(63) Continuation-in-part of application No. 10/628,064, filed on Jul. 25, 2003, now abandoned.

(60) Provisional application No. 60/398,757, filed on Jul. 26, 2002.

(51) Int. Cl.
*B60D 1/40* (2006.01)

(52) U.S. Cl. .................. 280/478.1; 280/479.2

(58) Field of Classification Search ............ 280/478.1, 280/479.2, 479.3, 480.1, 489, 491.1, 491.2, 280/515, 462
See application file for complete search history.

(56) References Cited

U.S. PATENT DOCUMENTS

| | | | |
|---|---|---|---|
| 2,973,971 A | 3/1961 | Oddson | 280/478 |
| 3,612,576 A * | 10/1971 | Marler | 280/479.3 |
| 3,622,182 A * | 11/1971 | Grosse-Rhode | 280/479.3 |
| 4,515,387 A | 5/1985 | Schuck | 280/478 |
| 5,011,176 A | 4/1991 | Eppinette | 280/479.3 |
| 5,277,447 A | 1/1994 | Blaser | 280/479.2 |
| 5,322,315 A | 6/1994 | Carsten | 280/479.2 |
| 5,327,978 A | 7/1994 | Bremner | 172/439 |
| 5,593,171 A * | 1/1997 | Shields | 280/479.2 |
| 5,722,678 A | 3/1998 | Hunger | 280/478.1 |
| 5,727,805 A | 3/1998 | La Roque | 280/478.1 |
| 6,328,326 B1 | 12/2001 | Slatten | 280/479.3 |
| 6,357,779 B1 | 3/2002 | Mok et al. | 280/478.1 |
| 6,729,637 B2 * | 5/2004 | Wolters et al. | 280/491.3 |
| 6,863,294 B1 * | 3/2005 | Bonham | 280/479.2 |

* cited by examiner

*Primary Examiner*—Tony Winner
(74) *Attorney, Agent, or Firm*—Ishman Law Firm P.C.

(57) ABSTRACT

A hitch assembly for connecting a towed vehicle to a towing vehicle include a housing mounted on the towing tongue of the towed vehicle having a tow bar mounted in an internal cavity having a restricted throat. Tow bar can be extended and pivoted to position a hitching eyelet on a variably proximately located towed vehicle. The tow arm coacts with the walls of the cavity to provide a torque on the tongue upon forward or rearward movement of the towing vehicle. Upon rearward movement of the towed vehicle, the tow bar attains an aligned nested position in the cavity and a lock assembly is actuated for locking the tow arm to the housing.

5 Claims, 13 Drawing Sheets

TELESCOPING AND SWIVELING HITCH ASSEMBLY

RELATED APPLICATION

This application is a continuation-in-part of U.S. application Ser. No. 10/628,064, filed Jul. 25, 2003 now abandoned, which claims the benefit of U.S. Provisional Application No. 60/398,757, filed Jul. 26, 2002, both in the of Thomas M. Williams, Jr. and entitled "Telescoping and Swiveling Hitch Assembly".

FIELD OF THE INVENTION

The present invention relates to coupling systems for releasably interconnecting a towing vehicle with a towed vehicle and, in particular, a telescoping and swiveling hitch assembly for enabling coupling between proximately located vehicles.

BACKGROUND OF THE INVENTION

Powered and trailed vehicles are conventionally interconnected for travel by coupling hitches involving fixed locations on the vehicles. Using ball and socket type universal connections or pin type connections the required relative movement during travel is provided. The fixed locations, however, are difficult to effect particularly with large vehicle that prevent ready manual alignment for final coupling. When accurate alignment is not obtained, the towed vehicle is manually moved to proper position, requiring strength, dexterity and multiple personnel, often with an attendant risk of injury. As the tongue weight of the towed vehicle increases the skills and risks are substantially increased. The problem is particularly troublesome for large steerable wheel trailers, such as employed by the military.

Telescoping and pivoting hitches have been proposed to allow coupling between misaligned vehicles. Most are designed for lighter weight trailers and unsuited for heavy load applications. Others provide only a length dependent articulation reducing the accommodated zone of vehicle misalignment.

For instance, U.S. Pat. No. 4,515,387 to Shuck utilizes a tongue that must be fully extended before tow bar can be pivoted, thereby restricting the permissible zone of vehicle misalignment. The hitch is formed of lightweight materials not suitable for heavy trailer applications. Further, the alignment torque during retraction is borne by a sliding pin connection further reducing the ability to handle heavier trailer units. U.S. Pat. No. 5,277,447 to Blaser also provides a telescoping hitch that is pivotal only in the fully extended position.

U.S. Pat. No. 5,011,176 to Eppinette discloses a telescoping arm having a pivoting outer end allowing coupling to a misaligned vehicle. The towing vehicle must be moved forwardly to align the arm sections, at which time a slidable collar is placed around the pivot connection to prevent pivoting. Thereafter, the towing vehicle reversed to shift the arm to a retracted locked towing position. The need for forward movement, which is not always possible or convenient, and the multiple manual steps for achieving final coupling are disadvantageous.

U.S. Pat. No. 5,322,315 to Carsten discloses a fixed pivot arm having a telescoping outer end mounted on the towing vehicle. After coupling, the towing vehicle must be moved forwardly for aligning and locking the pivoting arm and thereafter rearwardly for locking the telescoping arm. U.S. Pat. No. 6,357,779 to Mok et al. also provides a fixed pivot arm having a telescoping outer end that requires forward movement for vehicle alignment and rearward movement for retraction and locking.

U.S. Pat. No. 6,328,326 to Slatten discloses a hitch tongue that is slidably and pivotally supported on a housing for coupling misaligned vehicles. The tongue and housing have complementary camming surfaces for nested alignment in a locked position. The camming surfaces provide limited aligning torque precluding usage on heavier trailer applications.

BRIEF SUMMARY OF THE INVENTION

The present invention provides a hitch assembly suitable for heavy vehicle applications that may be readily deployed for final coupling by rough relative positioning of the vehicles. The hitch assembly comprises only two unitized subassemblies, a housing and a tow bar, that may be assembled, and disassembled for repair, using simple tools. In one aspect, the hitch assembly comprises: a housing member having an internal cavity with a restricted throat opening; an tow bar member extending into the cavity an having a tail section larger than the throat opening and establishing when engaged therewith a pivotal connection for forward aligning movement, the tow bar member being supported by said housing member for cojoint longitudinal and pivotal movement between a retracted coupled position and an extended alignment position; means for mounting the housing member on one of the vehicles; means for mounting a component of the coupling member on the tow bar member; and latching means permitting movement of the tow bar member between the coupled position and the alignment position in a unlatched condition and fixedly connecting the tow bar member to the housing member in a latched condition; and actuating means for selectively moving said latching means between said unlatched condition and said latched condition.

The cavity has a parabolic shape characterized by widely spaced sidewalls gradually sloping inwardly from the throat and merging with a rounded base. The configuration allows substantial articulation for entire range of extension as the tow arms horizontally floats within the cavity. According, a coupling zone is provided of relatively constant width and substantial length thereby accommodating a wide range of vehicle misalignments. While the vehicles may be aligned by initial forward movement of the towing vehicle, advantageously the towing vehicle may be directly reversed to effect alignment and coupling. During initial rearward movement, the tow arm freely moves until contacting the cavity wall. Thereafter, a substantial lever arm is established with the throat providing a substantial aligning torque on the trailer tongue. As the tow arm reaches the retracted position. Nesting surfaces on the tow bar and housing coact for effecting final alignment. Whereas current military and heavy load vehicles require multiple attempts for proper vehicle placement and multiple personnel for final positioning and coupling, the present invention provides a permissible preliminary alignment zone that can be readily achieved by the vehicle operator. Moreover, either the vehicle operator or a single ground personnel, can establish the hitch coupling, with final retraction and locking accomplished with a single rearward vehicle movement.

Accordingly, it is an object of the present invention to provide a hitch assembly for interconnecting vehicles that accommodates a wide range of vehicle misalignments.

Another object of the invention is to provide a telescoping and swiveling hitch assembly for interconnecting vehicles that reduces the time, effort and personnel required to couple misaligned vehicles.

A further object is to provide a adjustable position hitch assembly that provides a constant width and substantial length zone for accommodating attachment to proximately located vehicles.

DESCRIPTION OF THE DRAWINGS

The above and other objects and advantages of the invention will become apparent upon reading the following written description taken in conjunction with the accompanying drawings in which.

DESCRIPTION OF THE PREFERRED EMBODIMENT

Figure 1:
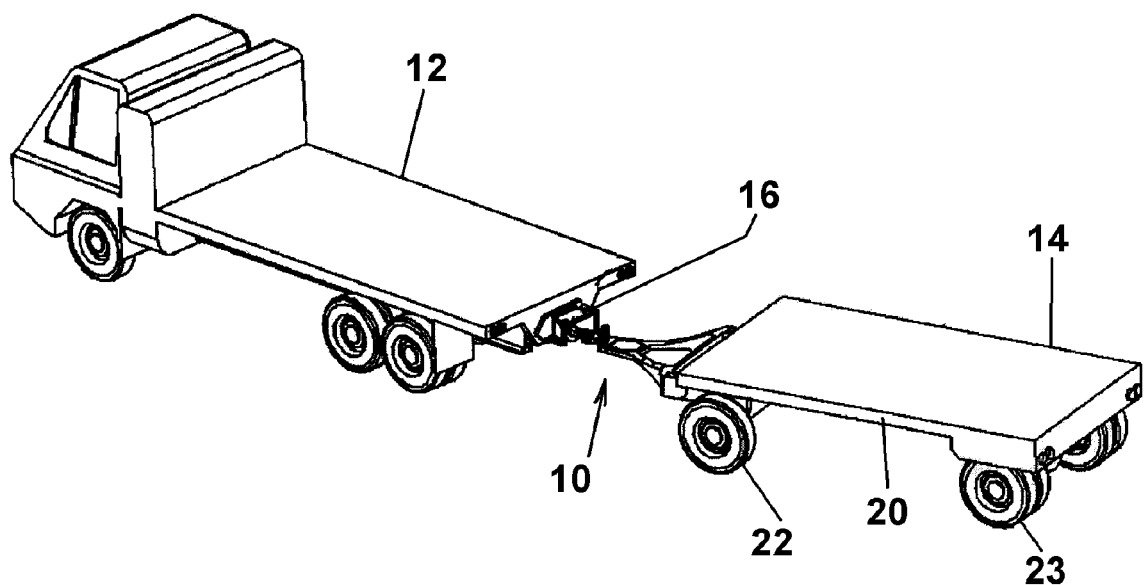
FIG. 1 is a perspective view of a truck and a trailer coupled with a hitch assembly in accordance with a preferred embodiment of the invention.
Figure 2:
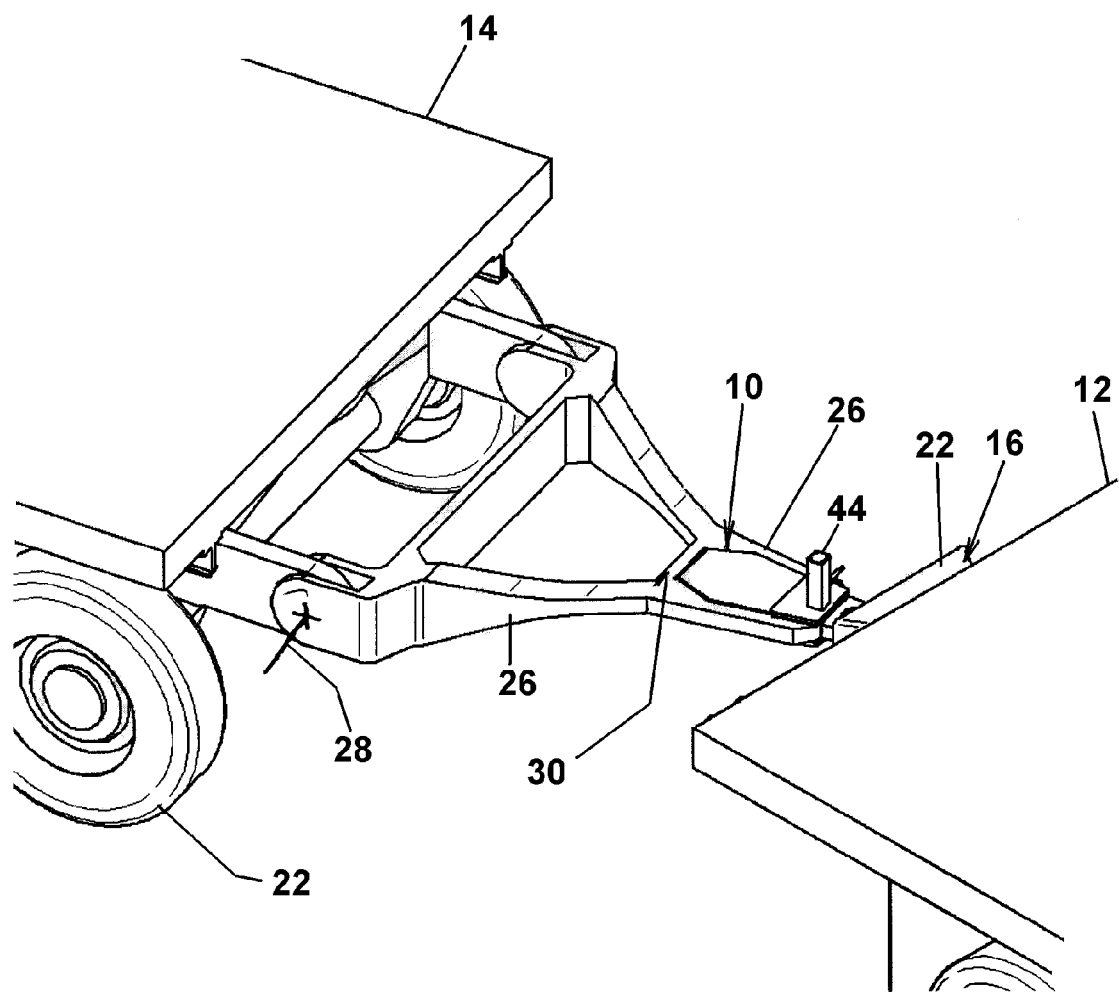
FIG. 2 is an enlarged perspective view of the hitch assembly in the coupled position with the truck.
Figure 3:
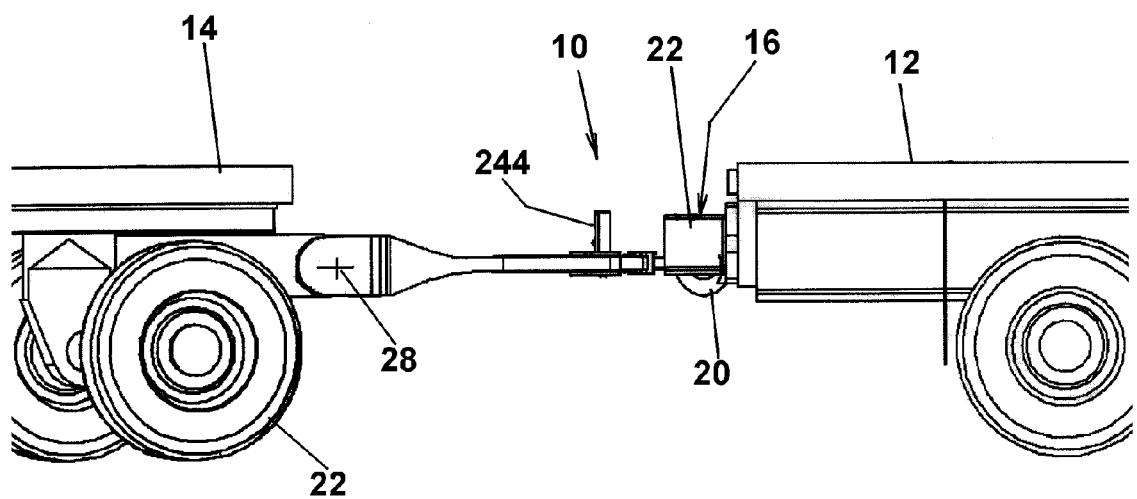
FIG. 3 is a side view of the truck and trailer coupled with the hitch assembly.

Referring to FIGS. 1 through 5, the present invention provides a telescoping and swiveling hitch assembly 10 for interconnecting a towing vehicle or truck 12 with a towed vehicle or trailer 14. The hitch assembly 10 is particularly adapted for heavy-duty vehicles, such as military transport systems. An exemplary towing vehicle is a Medium Tactical Vehicle Replacement (MTVR) truck and a suitable towed vehicle is a Medium Tactical Vehicle Replacement Variant trailer, both manufactured by Oshkosh Truck Corporation of Oshkosh, Wis. As will become apparent, the hitch assembly may alternatively fixedly mounted on either vehicle and be releasably coupled with the other vehicle. The hitch assembly may be combined with conventional coupling configurations, such a ball and socket or pinned couplings, for accommodating relative articulating or universal movement between the vehicles. The hitch 16 on the truck 12 is conventional for MTVR truck/trailer combines and comprises a hook or pintle 18 surrounded by a protective shield 19.

The trailer 14 includes a chassis 20 supported on front and real axle wheel assemblies 22, 23. The front wheel assembly 22 is steerable. A trailer tongue 24 includes forwardly and inwardly converging side arms 26. The side arms 26 are connected to the front wheel assembly 22 at horizontal pivot connections 28. A cross bar 30 laterally interconnects the arms 26. The front ends of the side arms 26 are laterally spaced whereby the side arms and the cross bar 30 form a forwardly opening generally triangular slot. In commercial units a tow bar assembly is removably connected at the forward end of the side arms at the slot entrance. In the present preferred embodiment the tow bar assembly is removed for direct reception, without further modification of the trailer, of the hitch assembly 10 and using a modification of the existing hitch eyelet.

Figure 6:
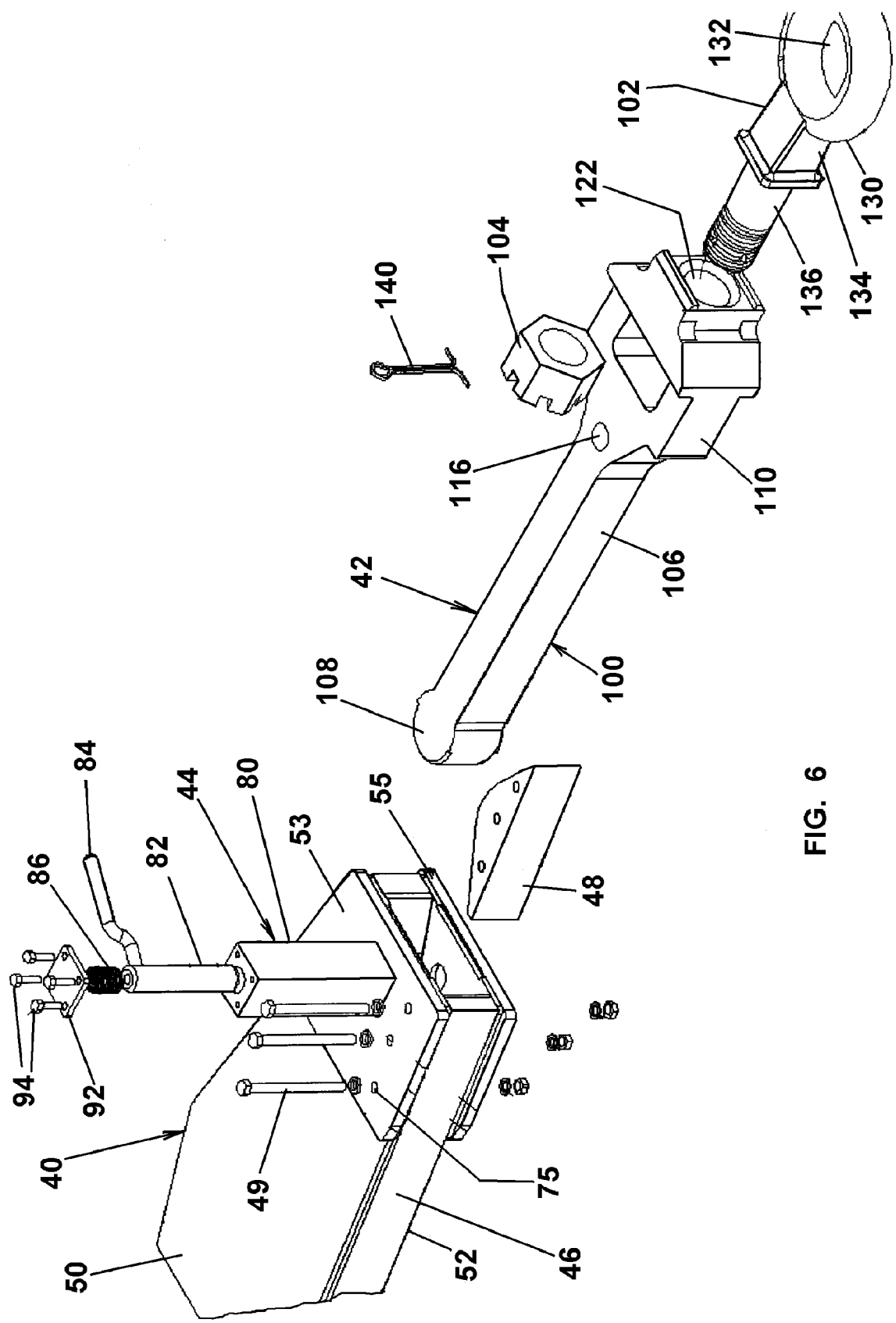
FIG. 6 is a partially exploded perspective view of the hitch assembly.
Figure 7:
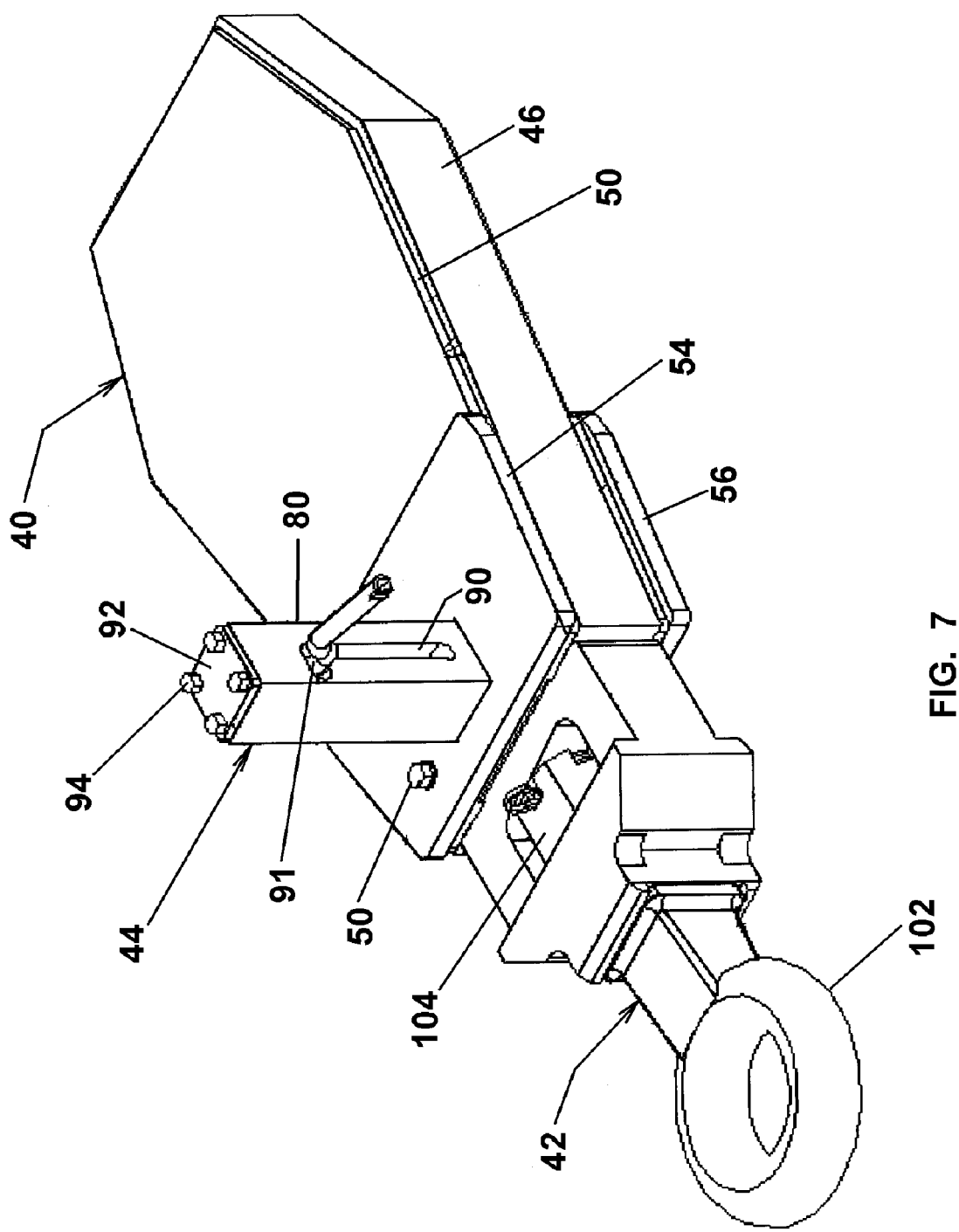
FIG. 7 is a perspective view of the hitch assembly.

Referring to FIGS. 6 and 7, the hitch assembly 10 comprises two subassemblies: a housing assembly 40 and a telescoping and swiveling tow bar or probe assembly 42. The housing assembly includes a lock assembly 44. As described in greater detail below, upon release of the lock assembly 44, the probe assembly 42 has free horizontal movement and in combination with the pivoting of the trailer tongue 24 about the pivotal connections 28 permits the ready and safe coupling with a proximately located truck hitch.

The housing assembly 40 is hexagonal and configured to be received in the tongue slot of conventional MTVR trailers. The housing assembly 40 is welded or mechanically connected to the side arms 26 and cross beam 30.

The housing assembly 40 comprises a hexagonal center guide block 46, a removable triangular stop collar 48 assembled with fasteners 49, a hexagonal top cover plate 50 and a hexagonal bottom cover plate 52. Preferably, the plates 50, 52 are peripherally welded to the guide block 46 to provide a unitized assembly. A top reinforcing plate 53 is welded to the top cover plate 50 at the forward end thereof. A bottom reinforcing plate 55 is welded to the bottom cover plate 52 at the forward end thereof.

Figure 8:
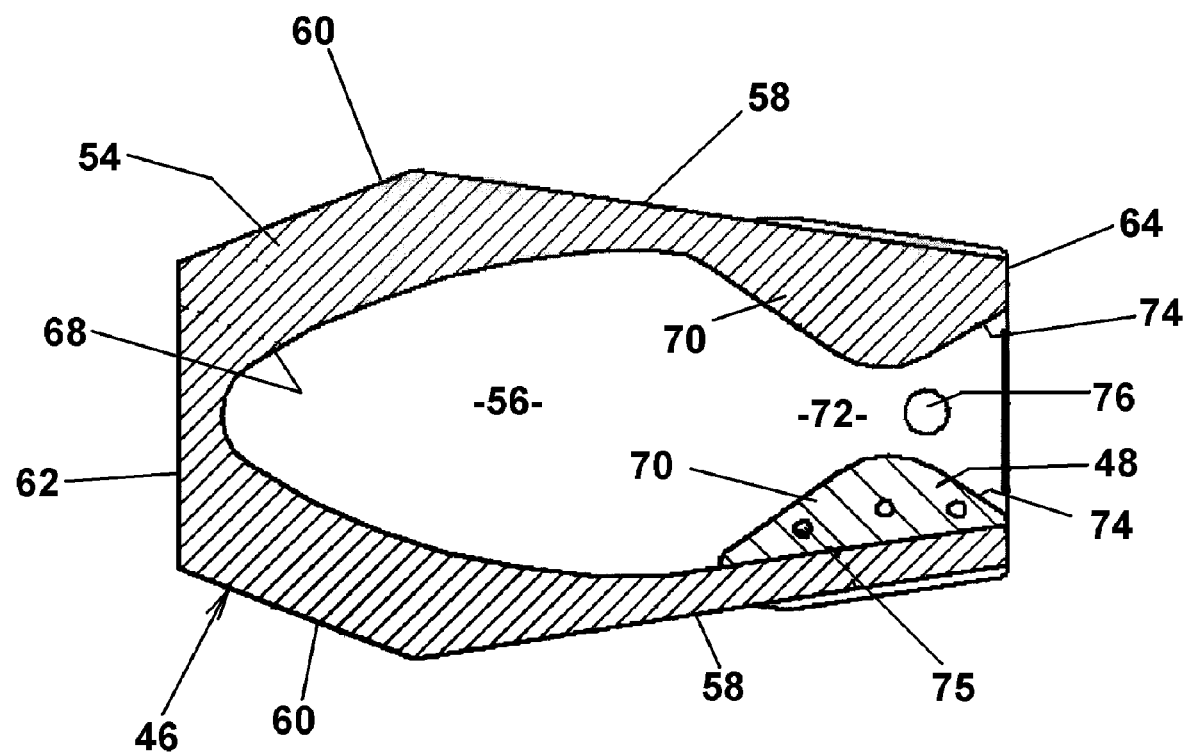
FIG. 8 is a horizontal cross sectional view of the hitch housing.

As shown in FIG. 8, the guide block 46 comprises a unitary body 54 having a generally U-shaped forwardly opening cavity 56. The body 54 is exteriorly defined by forwardly inwardly converging front sidewalls 58, rearwardly inwardly converging rear side walls 60, a transverse rear wall 62 and a centrally vertically slotted front wall 64. As discussed above, the front sidewalls 58 nest with the inner surfaces of the side arms 26 of the tongue, and the rear wall 62 engages the cross beam 30 whereat the housing assembly is welded or mechanically affixed.

The cavity 56 is defined by a continuous inner wall 68 in the longitudinal center of the body 54 and comprises a U-shaped, forwardly opening parabolic base and a pair of laterally spaced, apex opposed triangular sections 70, one of which is the removable stop collar 48. With the stop collar 48 assembled with the fasteners 49 establishing a constricted frontal throat opening 72 and frontally terminating with outwardly diverging planar guide surfaces 74, forming a forwardly opening wedge shaped, tapered socket. Vertical through holes are drilled through the housing assembly and the stop collar 48 for the shanks of the fasteners 49 thereby providing for ready assembly and replacement of the collar 48. A vertical bore 76 is formed through the longitudinal center of the housing assembly 40 and the lock assembly 44 forwardly of the opening 72 for reception of the lock bolt of the lock assembly 44.

The lock assembly 44 includes a lock block 80, a lock bolt 82 having an actuating handle 84 and spring biased downwardly by a compression spring 86. The lock block 80 is a rectangular bar attached by welds to the top reinforcing plate 53 and centered over the vertical bore 76. The lock block includes a bore extension concentric and complementary to the bore 76 and formed concurrently therewith. The lock bolt 82 is cylindrical and slidably supported in the bore 76. An inverted J-slot 90 is formed in the sidewall of the lock block 80. The inner end of the handle 84 extends through the slot 90 and connected in a counterbore in the side of the lock bolt 82. When the handle 84 resides at the base of the slot 90, the lock bolt 82 extends through the bore 76 to the bottom plates 52, 56 of the housing assembly 40 to establish a locked condition with the tow probe 42. When the handle 84 is raised to the top of the slot 90 and rotated into the side notch 91 thereof, the lock bolt 82 is in an unlocked position with the lower end thereof above the guide block 46. A cover plate 92 is connected to the top of the lock block by fasteners 94 thereby capturing and preloading the spring 88 against the top of the lock bolt 82.

Figure 9:
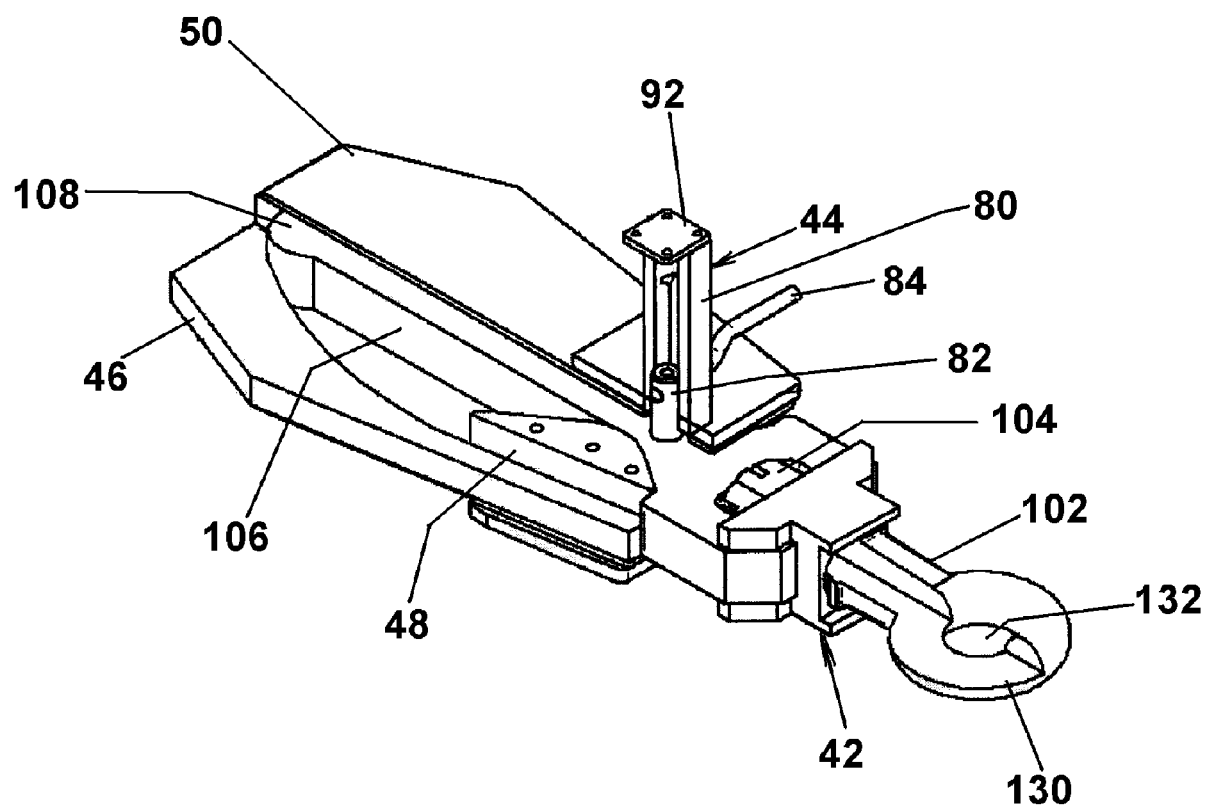
FIG. 9 is a partially sectioned perspective view of the hitch assembly in the locked position.
Figure 10:
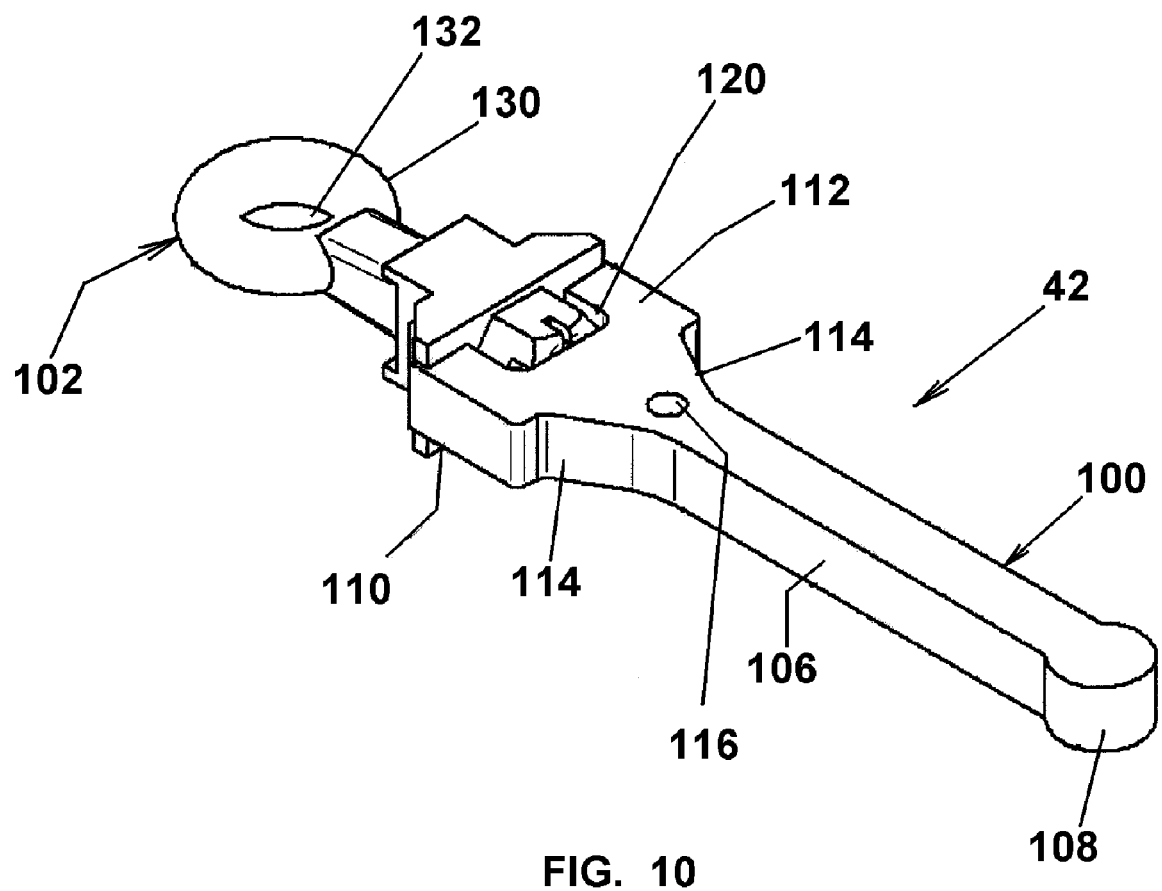
FIG. 10 is a perspective view of the tow bar of the hitch assembly.

Referring additionally to FIGS. 6, 9 and 10, the tow probe 42 comprises an elongated tow bar 100 connected to a hitch eyelet 102 by threaded nut 104. The tow bar 100 includes straight rectangular center section 106 narrower in width than the throat opening 72, an enlarged circular tail section 108 and an enlarged head section 110. When the tow bar 100 is in the fully retracted position, the tail section 108 engages the end wall of the housing cavity. When the tow bar 100 is in the fully extended position, the tail section 108 engages the walls of the collar sections 70 to establish a load bearing pivotal connection with the housing.

The head section 110 includes a base 112 having rearwardly inwardly inclined sidewalls 114 forming a tapered wedge adapted to conformally nest with the frontal walls 74 of the housing to center the tow probe 40 at and proximate to the retracted position. A through hole 116 is formed in the base 112 and is coaxial with the bore 76 in the housing to permit movement of the lock bolt between positions.

A vertical slot 120 is formed in the center of the head section. A longitudinal bore 122 is formed in the front end of the head section and intersects the slot 120. The hitch eyelet 102 includes a cylindrical hook 130 having a vertical opening 132, a base 134 rearwardly terminating with a threaded stud 136. In assembly, the stud 136 is inserted through the hole 122 and the nut 104 threaded thereon to clamp the eyelet 102 to the probe head 110. The assembled condition is maintained by a cotter pin 140 assembled in a conventional manner through radial slots and cross holes in the nut 104 and stud 136, respectively.

It will be appreciated that the tow probe horizontally floats without fixed pivots within the confines of cavity to provide a wide zone of articulation throughout movement between the retracted and extended positions. This provides for a large strike zone for the eyelet to enable coupling with a proximately positioned pintle thereby obviating the need for tedious positioning of the towing vehicle and manual position of the trailer tongue.

Figure 4:
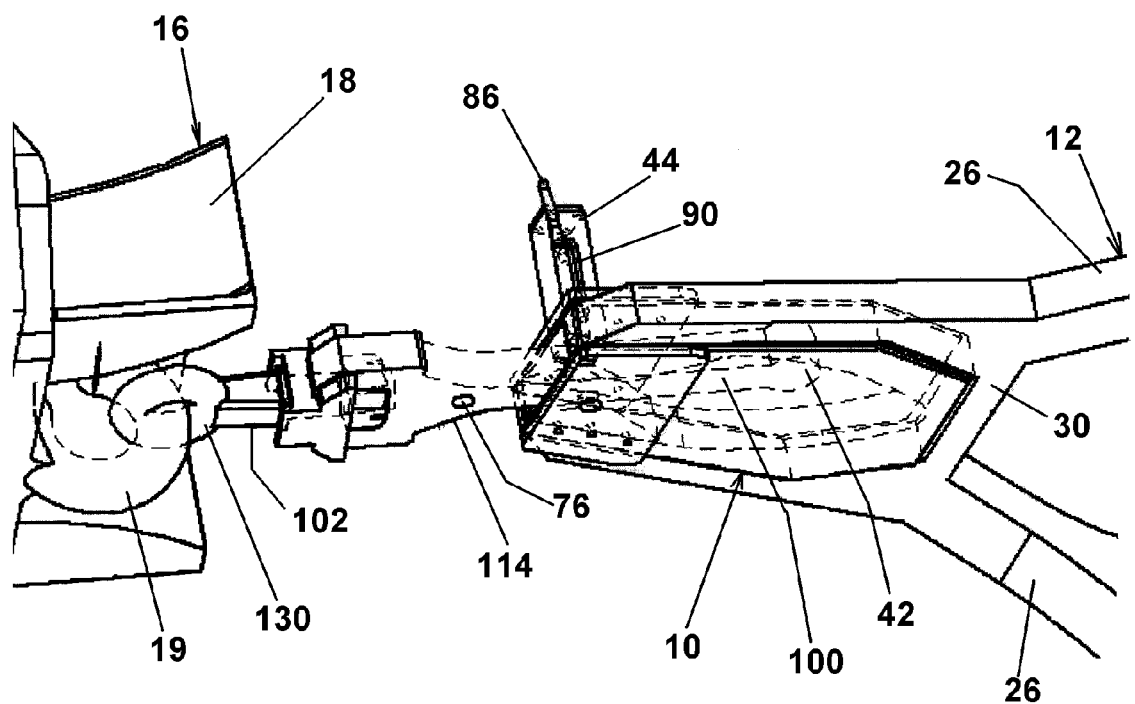
FIG. 4 is a bottom perspective view of the hitch assembly in the extended and swiveled position at initial hookup with the truck.
Figure 5:
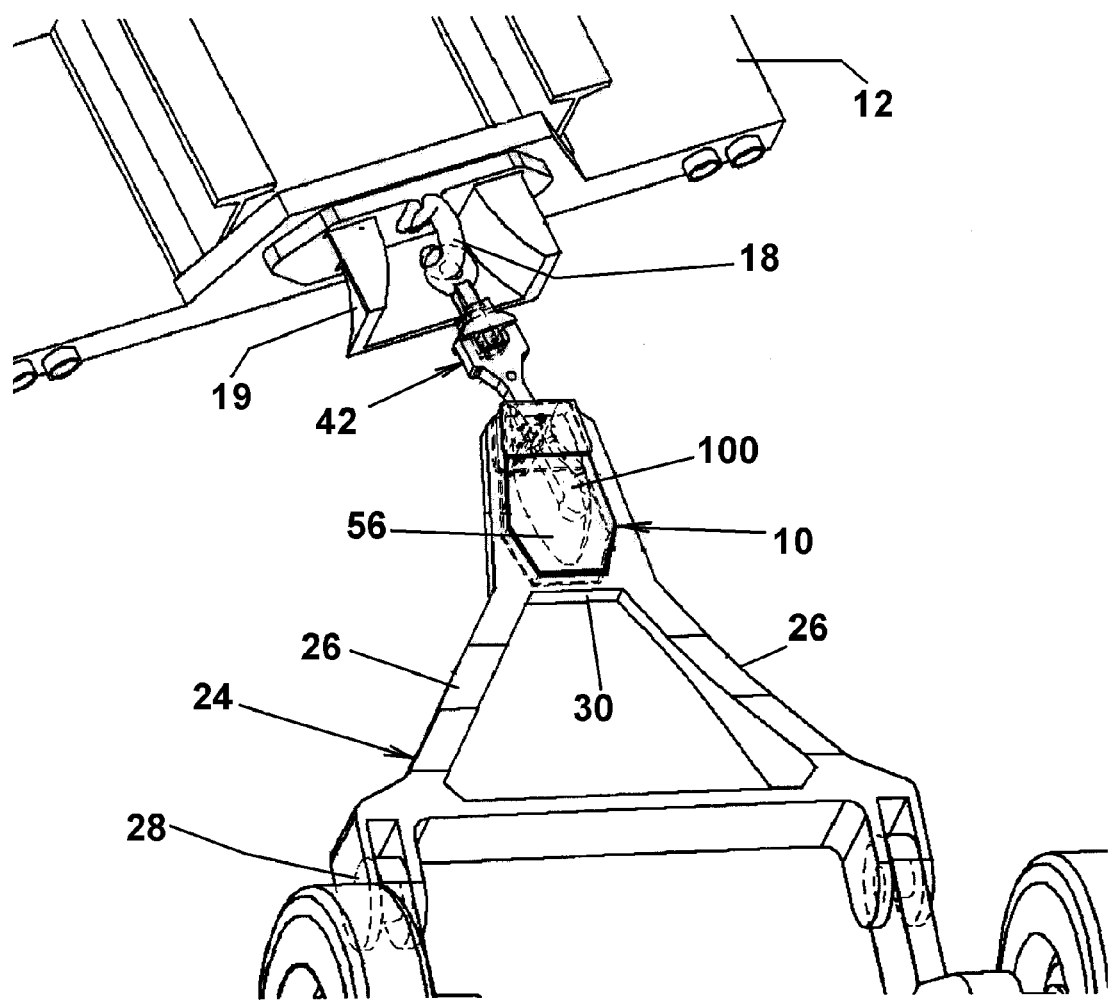
FIG. 5 is a top perspective view of the hitch assembly in the extended and swiveled position.

As representatively shown in FIGS. 4 and 5, the vehicle 12 may be positioned at an angle with respect to the trailer and longitudinally separated, from a normal coupling position. To achieve coupling notwithstanding such misalignment, the handle 84 is raised in the slot 90 and rotated to the side notch 91 to provide a detented unlocked condition withdrawing the lock bolt from the tow arm. The tow probe 42 is then manually telescopically withdrawn and the eyelet 130 coupled with the pintle hook 18. After withdrawal, the handle 84 may be releases thereby biasing the lock bolt 82 against the top surface of the center section 106

Final coupling may be accomplished in plural ways. In a direct method, the vehicle 12 may be directly backed toward the trailer. Before movement the latch handle 84 may be rotated into the slot and biased against the top surface of the tow probe. Rearward vehicle movement will drive the tow probe toward a retracted position whereat the cavity wall and opposed collar 70 are engaged thereby generating an aligning torque moving the tongue of the trailer toward longitudinal alignment with the tow bar. As the tow bar approaches the retracted position and the cavity wall become transverse to movement, the guide walls 114 of the head section 112 coact with the front walls 74 to provide a continuing aligning torque to accurately longitudinally align the tow probe in the cavity. When alignment is complete, the spring 88 biases the lock bolt through the opening 116 in the tow bar to effect without manual assistance the locked condition thereby permitting full transporting of the trailored vehicle 14.

In the indirect method, the towing vehicle 12 is moved forwardly thereby fully extending the tow probe and establishing the load bearing pivotal connection at the collar with the tail section 108. Further forward movement will establish an aligning torque on the tongue to longitudinally align the tow probe. When aligned the towing vehicle is backed until the tow probe is in the nested fully retracted position and the lock bolt actuated to the locked position.

The hitch assembly 10 may be integrated in various ways with the desired vehicle, for example by mechanical or welded attachment at the rear, or by integration into the towing tongue, or other suitable means.

Depending of the relative configuration of the housing components, a desired amount of extension and pivoting of the tow bar assembly can be provided. In actual use, a 30 inch extension with a 30 inch lateral swivel span has been successfully integrated into MTVR truck/trailer units.

Figure 11:
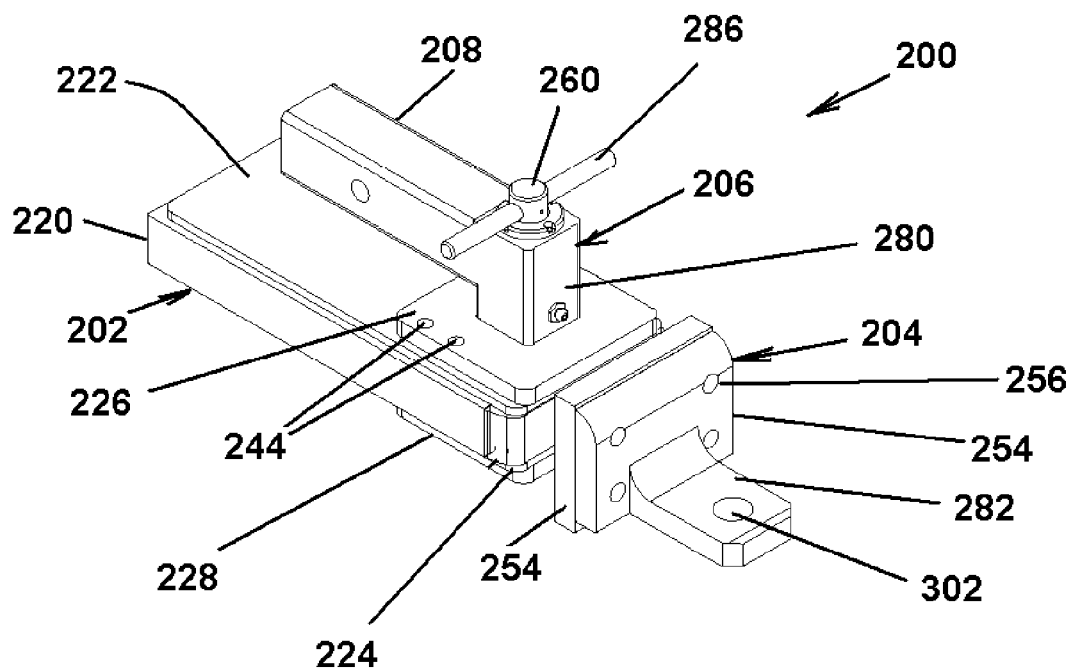
FIG. 11 is a left side perspective view of another embodiment of the hitch assembly.
Figure 12:
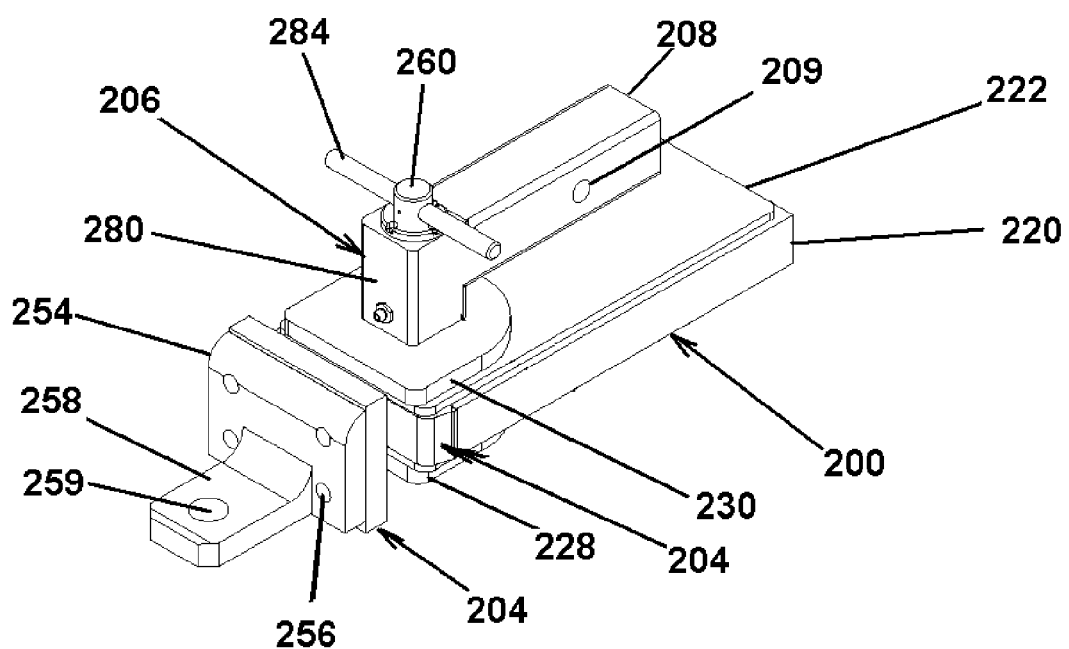
FIG. 12 is a right side perspective view of the hitch assembly of FIG. 11.

Referring to FIGS. 11 and 12, there is illustrated another embodiment of the invention for use with lighter weight vehicles, such as trucks and automobiles. The hitch assembly 200 comprises two subassemblies: a housing assembly 202 and a telescoping and swiveling tow bar or probe assembly 204.

Figure 18:
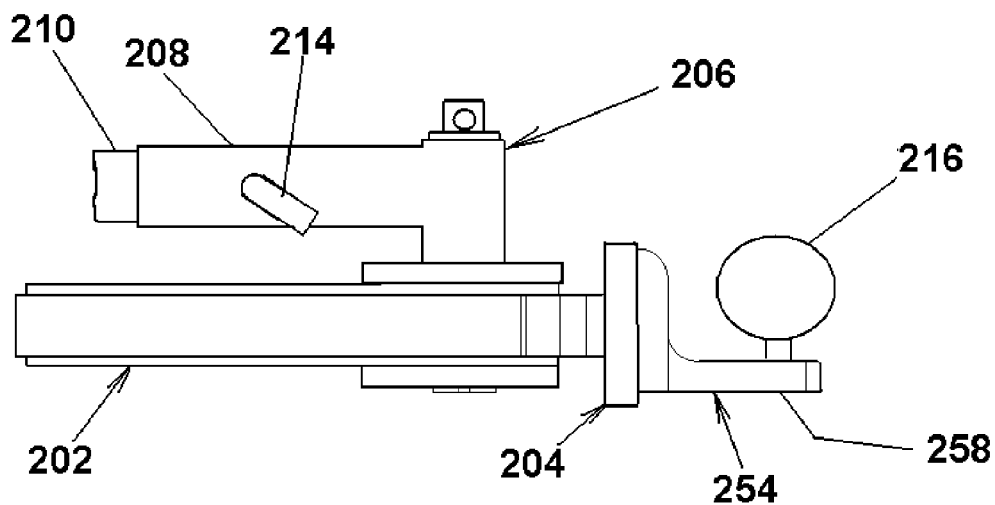
FIG. 18 is a side view of the hitch assembly of FIG. 1 coupled to a hitch of a towing vehicle.

The housing assembly 202 includes a lock assembly 206 having a rearwardly extending coupling arm 208 formed or rectangular tube. As shown in FIG. 18, the coupling arm 208 is telescopically removably coupled with a hitch box 210 and the towing vehicle by pin 214 inserted through transverse hole 219 in the coupling arm. The hitch box 210 is preferably a rectangular socket-type coupled commonly referred to a "Reese" hitch. The probe assembly 204 is provided with a ball member 216 for coupling with the hitch on the towed vehicle. As such, no further modification to the vehicle is necessary. It will, however, be apparent that the hitch may be mounted by other conventional methods to the selected vehicle.

As in the prior embodiment, the lock assembly 206 in the unlatched condition provides the probe assembly 204 with free horizontal and pivotal movement, which in combination with the pivoting of the trailer tongue on the towed vehicle permits the ready and safe coupling therebetween.

Figure 13:
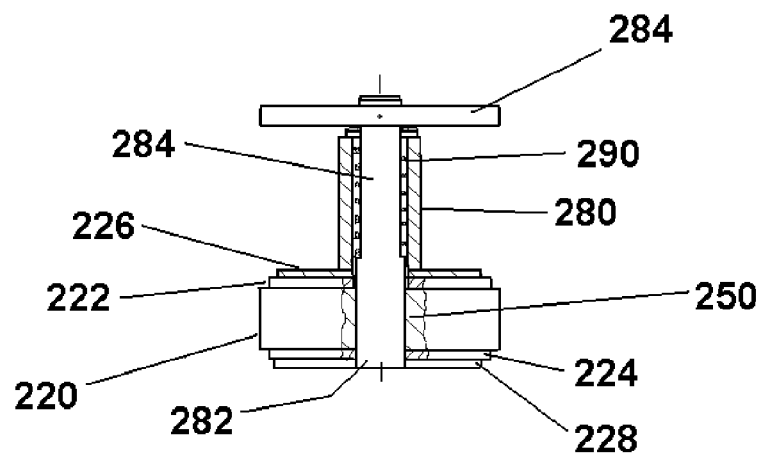
FIG. 13 is partially section front view through the loch assembly of the hitch assembly of FIG. 11.
Figure 14:
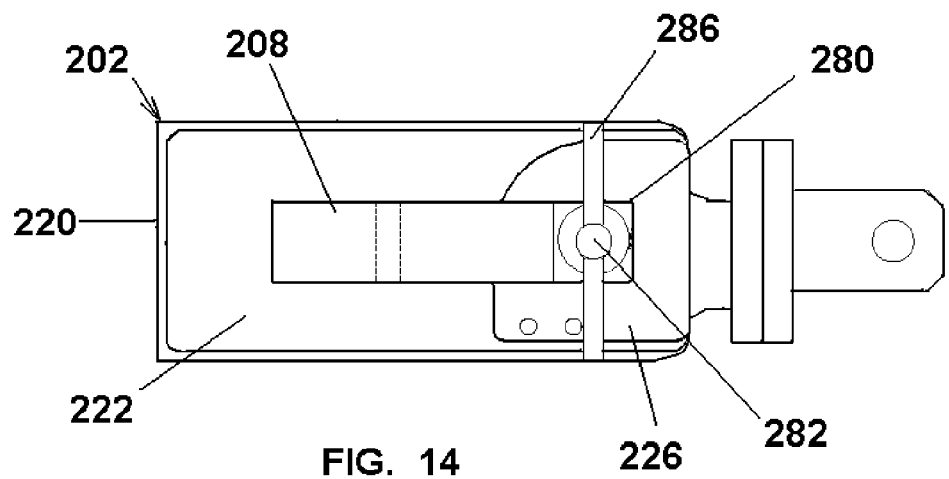
FIG. 14 is a top view of the hitch assembly of FIG. 11.
Figure 15:
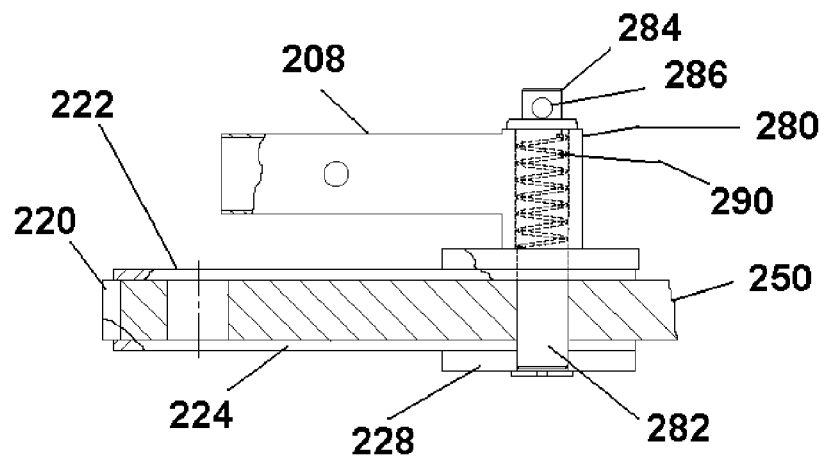
FIG. 15 is a partially section side view of the hitch assembly of FIG. 11.

Referring to FIGS. 13 through 15, the housing assembly 200 comprises a rectangular center guide block 220, a rectangular top cover plate 222 and a rectangular bottom cover plate 224. Preferably, the plates 222, 224 are peripherally welded to the guide block 220 to provide a unitized assembly. A top reinforcing plate 226 is welded to the top cover plate 222 at the forward end thereof. A bottom reinforcing plate 228 is welded to the bottom cover plate 224 at the forward end thereof.

Figure 16:
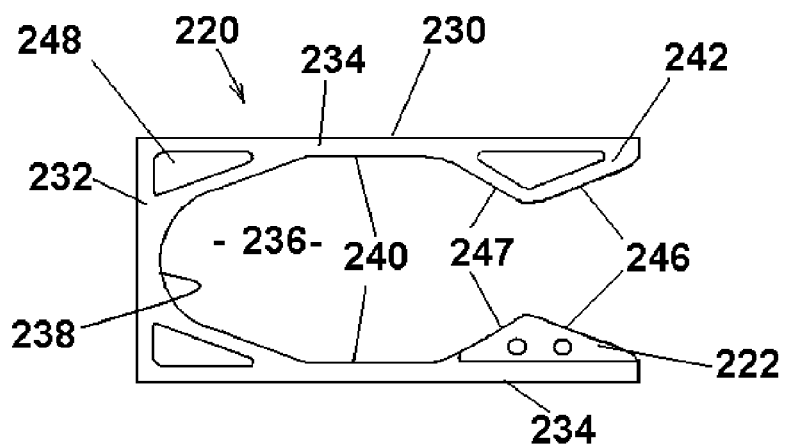
FIG. 16 is a top view of the guide plate of the hitch assembly of FIG. 11.
Figure 17:
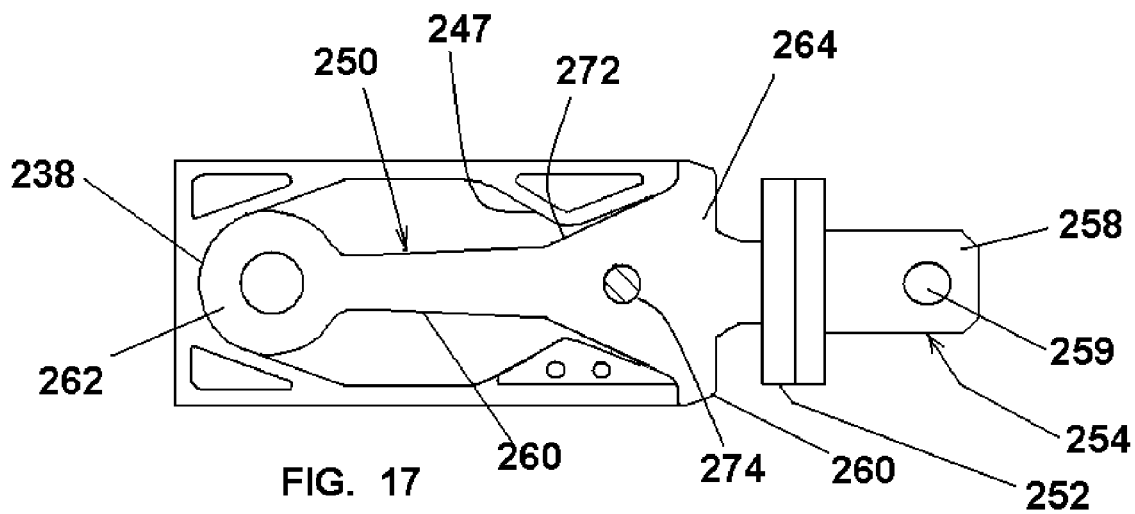
FIG. 17 is a top view of the hitch assembly of FIG. 11 with the top plate removed.

As shown in FIG. 16, the guide block 220 comprises a unitary body 230 having a base 232 and forwardly extending laterally spaced arms 234. The inner surfaces of the base 232 and the arms 234 provide a generally U-shaped forwardly opening slot forming a cavity 236 in assembly. The cavity 236 is defined by a continuous inner wall comprising a U-shaped, forwardly opening parabolic base wall 238 and laterally spaced center walls 240. The arms 234 frontally terminate with a pair of laterally spaced, apex opposed triangular collars 242, one of which is the removable stop collar 222. The stop collar 222 is removably assembled with the fasteners 244 (FIG. 11). The inner tips of the triangular collars 222, 242 establish a constricted frontal throat. The collars 222, 242 have outwardly diverging planar front guide surfaces 246 and rear guide surfaces. The front guide surfaces 246 form, in assembly, a forwardly opening wedge shaped, tapered socket. Vertical through holes are drilled through the housing assembly 202 and the stop collar 222 for the shanks of the fasteners 244 thereby providing for ready assembly and replacement of the collar 222. Triangular passages 248 are formed in the base 232 and the arms 234 for reducing the weight of the housing assembly Referring to FIG. 17, the probe assembly 204 comprises an elongated tow bar 250 welded at an outer end to a face plate 252 that is connected to a hitch eyelet 254 by fasteners 256 (FIG. 11). The hitch eyelet 254 terminates with a horizontally projecting arm 258 having an aperture 259 for receiving the shank for the ball 216. The tow bar 250 includes straight rectangular center section 260 narrower in width than the throat in the guide block 220 having an enlarged circular tail section 262 at the rear end and an enlarged generally triangular head section 264 at the front end. When the tow bar 250 is in the fully retracted position, the tail section 262 engages the base wall of the guide block 220, nesting at the base wall 238. When the tow bar 250 is in the fully extended position, the tail section 262 engages the rear guide surfaces 247 of the collars 222, 242 to establish a load bearing pivotal connection with the housing assembly 202.

The head section 264 includes rearwardly inwardly inclined sidewalls 272 forming a tapered wedge adapted to nest with the front guide walls 246 in the guide block socket to center the tow probe 204 proximate to and at the retracted position. A through hole 274 is formed in the base 270 for permitting movement of the lock assembly 206 between locked and unlocked positions. between positions, as described below.

Referring to FIGS. 13 through 15, the lock assembly 206 includes a vertical lock block 280 attached to the top plate and connected to the coupling arm 208 at an upper end. The lock block 280 has a vertical bore aligned with aperture 274 to the arm 260 and corresponding apertures in the plate 224, 228. A cylindrical lock bolt 282 is slidably supported in the bore. The lock bolt 282 includes a reduced diameter shaft 284 at an upper end. A transverse actuating handle 286 is attached the upper end of the shaft 284. A compression spring 290 is carried on the shaft 284 and compressively retained between the lock bolt and a retaining cap 292 at the upper end of the lock block 280. Accordingly, the lock bolt 282 is compressively biased to the locked position shown in FIGS. 13 and 15 wherein the lock bolt passes through the aperture 274 in the tow arm 260. The handle 286 is raised against the biasing of the spring 290 to an unlocked position whereat the probe assembly 204 may be extended. Thereafter, the lock bolt rides against the top surface of the tow bar until aligned with the tow bar aperture for automatic self biasing to the locked position.

In operation, the towing vehicle is backed proximate the hitch of the towed vehicle. The actuating handle 286 is raised to the unlocked position and the tow bar 260 manually extended, and aligned with and coupled in a conventional manner with the towed vehicle hitch box 210. Thereafter if a considerable misalignment between the vehicles exists, the towing vehicle may be moved forwardly to longitudinally align the tow bar at the pivotal connection between the collars 242, 222 and the tail section 262. Then the vehicle is reversed causing the tow bar tail 262 to engage the rearwardly converging surfaces of the base wall for further alignment and the head to nest in the front housing socket thereby achieving an aligned position whereat the lock assembly is actuated to the locked condition. For lesser misalignments, the towing vehicle may be backed toward the towed vehicle whereby the tail 262 reacts initially with the side walls 240 to begin aligning pivotal movement of the tongue and subsequently reacts with the converging surface of the base wall for final alignment.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed is:

1. A hitch assembly for mounting on a towing tongue of a towed vehicle and coupling at a hitch connection of a tow vehicle variably longitudinally and laterally spaced with respect thereto wherein said tongue has forwardly and inwardly converging side arms, said hitch assembly comprising: a housing having a center plate, a top plate and a bottom plate having frontal side walls adapted to engage and be affixed to the side arms of said towing tongue; a generally forwardly opening U-shaped cavity formed in said center plate, said cavity defined a rounded base and laterally spaced longitudinally extending side walls; a restricted throat section at the front portion of said cavity having inwardly inclined walls merging with said longitudinally extending side walls and mutually spaced to form a restricted passage therebetween; an elongated tow bar member having a head section and a tail section interconnected by a straight center section, said center section having a width narrower than said restricted passage of said throat section and extending therethrough with said tail section located in said cavity, said tail member being cylindrical and larger than said restricted opening, said tail section engaging said throat section in an extended position to form a pivotal connection therewith and engaging said base of said cavity in a retracted position; nestable surfaces formed on said head section and said throat section interengaging as said tow bar member approaches said retracted position to effect mechanical longitudinal alignment of said tow bar member with said housing; a hitch component on said head section for coupling with said hitch connection of said tow vehicle; a first vertical passage formed through said top plate and said bottom plate adjacent said restricted passage; a second passage formed in said tow bar member and coaxially aligned with said first passage when said tow bar member is in said retracted position; a lock block vertically connected to said top plate and having a third passage coaxial with said first passage; a lock bolt slidably carried in said third passage and slidable between a raised position above said restricted passage and a lowered position extending through said first and second passages to thereby lock said tow bar member to said housing member; an actuating member operatively connected to said lock bolt for moving said lock bolt from said lowered position to said raised position; detent means operatively associated with said lock bolt and said lock block for maintaining said lock bolt in said raised position; and spring means carried in said third passage for biasing said lock bolt to said lowered position.

2. A hitch assembly for coupling a towed vehicle to a proximately located tow vehicle longitudinally and angularly misaligned therewith, said hitch assembly comprising: a housing assembly and a tow bar assembly, said housing assembly having a longitudinally extending forwardly opening cavity therein frontally terminating with inwardly extending walls spaced to form a restricted throat opening, said cavity being defined by a generally U-shaped side wall having a rounded base section and longitudinally extending side sections of substantially greater width than said throat opening; said tow bar assembly including an elongated tow bar member having a width narrower than said throat opening and extending into the cavity, a curved tail section larger at the rear end of said tow bar member and in an extended position engaging said inwardly extending walls at said throat opening to provide a pivotal connection between said tow bar assembly and said housing assembly effective to provide longitudinal alignment therebetween upon forward movement of the tow vehicle, said tow bar member being supported by said housing assembly for cojoint longitudinal and pivotal movement between a retracted position and said extended alignment position; means for mounting said housing assembly on the towed vehicle; means on said tow bar member for coupling with the towing vehicle; and latching means permitting movement of said tow bar member between said retracted position and said extended position in an unlatched condition and fixedly connecting said tow bar member to said housing assembly in a latched condition; and actuating means for selectively moving said latching means between said unlatched condition and said latched condition.

3. A hitch assembly for coupling a first vehicle to a hitch member on a second vehicle, said hitch assembly comprising: a housing assembly having a generally forwardly opening U-shaped cavity, said cavity having a rounded base and laterally spaced longitudinally extending side walls; a restricted throat section at a front portion of said cavity having inwardly inclined walls merging with said longitudinally extending side walls and mutually spaced to form a restricted passage therebetween; an elongated tow bar member having a head section and a tail section interconnected by a straight center section, said center section having a width narrower than said restricted passage of said throat section and extending therethrough with said tail section located in said cavity, said tail member having a curved periphery and larger than said restricted opening, said tail section engaging said throat section in an extended position to form a pivotal connection therewith and engaging said base of said cavity to longitudinally align said tow bar member in a retracted position, cooperating surfaces formed on said head section and said throat section interengaging as said tow bar member approaches said retracted position to effect mechanical longitudinal alignment of said tow bar member with said housing assembly member; a hitch component on said head section for coupling with said hitch connection of said tow vehicle; a first vertical passage formed through said housing assembly adjacent said restricted passage; a second passage formed in said tow bar member and coaxially aligned with said first passage when said tow bar member is in said retracted position; a lock assembly carried on said housing assembly having a sliding lock bolt movable through said second passage in said tow bar member in said retracted position thereby locking said tow bar member to said housing assembly.

4. The hitch assembly comprising: a housing assembly and a tow bar assembly, said housing assembly having a longitudinally extending forwardly opening cavity therein frontally terminating with inwardly extending walls spaced to form a restricted throat opening, said cavity being defined by a base wall and longitudinally extending side walls of greater width than said throat opening; said tow bar assembly including an elongated tow bar member having a center section with a width narrower than said throat opening and extending into the cavity, an enlarged curved tail section connected to said center section having a size larger that said throat opening and engaging said inwardly extending walls to establish a pivotal connection therebetween in an extended position effective to provide longitudinal alignment therebetween upon forward movement of a towing vehicle, said tow bar member being supported by said housing assembly for cojoint longitudinal and pivotal movement between a retracted position wherein said tail section is aligned with said base wall and said extended alignment position; and latching means permitting movement of said tow bar member between said retracted position and said extended position in a unlatched condition and fixedly connecting the tow bar member to the housing assembly in a latched condition; and actuating means for selectively moving said latching means between said unlatched condition and said latched condition.

5. A hitch assembly for coupling a first vehicle to a hitch member on a second vehicle, said hitch assembly comprising: a housing assembly having a generally forwardly opening cavity having inwardly and rearwardly converging side walls, said cavity having inwardly and forwardly converging laterally spaced walls forming a restricted passage at a front portion; a tow bar member having a front section and a rear section interconnected by a center section, said center section slidably extending through said restricted passage with said tail section disposed in said cavity, said tail section having a curved periphery larger than said restricted passage and engaging said spaced walls thereof in an extended position to form a pivotal connection therewith, cooperating surfaces formed on said tail section and said side walls of said cavity interengaging as said tow bar member approaches said retracted position to effect mechanical longitudinal alignment of said tow bar member with said housing assembly; and latching means permitting movement of said tow bar member between said retracted position and said extended position in an unlatched condition and fixedly connecting the tow bar member to the housing assembly in a latched condition.

* * * * *